US012699425B2

(12) United States Patent
Jiang et al.

(10) Patent No.: US 12,699,425 B2
(45) Date of Patent: Aug. 4, 2026

(54) SUPPORTING DEVICE AND ELECTRONIC DEVICE

(71) Applicant: Lenovo (Beijing) Limited, Beijing (CN)

(72) Inventors: Wentong Jiang, Beijing (CN); Xuesong Fan, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 134 days.

(21) Appl. No.: 18/473,676

(22) Filed: Sep. 25, 2023

(65) Prior Publication Data

US 2024/0126346 A1     Apr. 18, 2024

(30) Foreign Application Priority Data

Oct. 17, 2022    (CN) .......................... 202211268911.3

(51) Int. Cl.
G06F 1/16          (2006.01)

(52) U.S. Cl.
CPC ............ G06F 1/166 (2013.01); G06F 1/1654 (2013.01)

(58) Field of Classification Search
None
See application file for complete search history.

(56) References Cited

U.S. PATENT DOCUMENTS

| | | | | |
|---|---|---|---|---|
| 7,916,468 | B2 * | 3/2011 | Takizawa ............... | F16M 13/00 |
| | | | | 361/679.44 |
| 9,280,181 | B2 * | 3/2016 | Tomita .................... | G06F 1/162 |
| 9,532,631 | B2 * | 1/2017 | Gu ........................ | A45C 13/005 |
| 9,823,704 | B2 * | 11/2017 | Armstrong ............ | G06F 1/1626 |
| 11,307,615 | B2 * | 4/2022 | Zimmerman ........... | G06F 1/166 |
| 2005/0139740 | A1 * | 6/2005 | Chen ..................... | G06F 1/1626 |
| | | | | 361/679.55 |

* cited by examiner

*Primary Examiner* — Hung S. Bui
*Assistant Examiner* — Elisa Sasserath
(74) *Attorney, Agent, or Firm* — ANOVA LAW GROUP, PLLC

(57)          ABSTRACT

A supporting device includes: a first support body and a second support body configured to rotatably connect to a display device and be in contact with a bearing surface to maintain a spatial posture of the display device. The first support body includes: a first body configured to detachably connect to a display device and including a first accommodation space, and a second body rotatably connected to the first body and configured to be in contact with a bearing surface to maintain a spatial posture of the first body or the display device connected to the first body. At least a part of the second support body matches the first accommodation space, such that connecting the second support body to the display device does not affect the connection between display device and the first body.

19 Claims, 10 Drawing Sheets

SUPPORTING DEVICE AND ELECTRONIC DEVICE

CROSS-REFERENCE TO RELATED APPLICATION

This application claims priority to Chinese Patent Application No. 202211268911.3, filed on Oct. 17, 2022, and the entire content of which is incorporated herein by reference.

TECHNICAL FIELD

The present disclosure relates to the technical field of electronic device technology, and more particularly, to a supporting device and an electronic device.

BACKGROUND

Supporting devices are widely used. However, the supporting devices currently available are lack of variety and unable to support diverse applications.

SUMMARY

One aspect of the present disclosure provides a supporting device. The supporting device includes: a first support body including a first body configured to detachably connect to a display device and including a first accommodation space and a second body rotatably connected to the first body and configured to be in contact with a bearing surface to maintain a spatial posture of the first body or the display device connected to the first body; and a second support body configured to rotatably connect to the display device and be in contact with the bearing surface to maintain a spatial posture of the display device. At least a part of the second support body matches the first accommodation space, such that connecting the second support body to the display device does not affect the connection between the display device and the first body.

Another aspect of the present disclosure provides an electronic device. The electronic device includes a supporting device. The supporting device includes: a first support body including a first body configured to detachably connect to a display device and including a first accommodation space and a second body rotatably connected to the first body and configured to be in contact with a bearing surface to maintain a spatial posture of the first body or the display device connected to the first body; and a second support body configured to rotatably connect to the display device and be in contact with the bearing surface to maintain a spatial posture of the display device. At least a part of the second support body matches the first accommodation space, such that connecting the second support body to the display device does not affect the connection between the display device and the first body.

Figure 1:
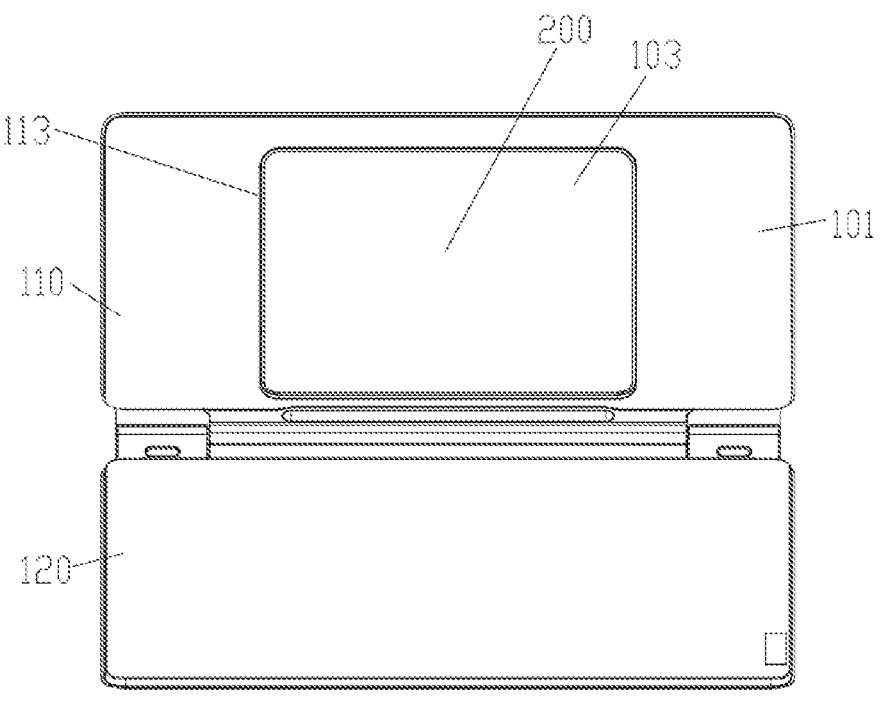
FIG. 1 is a schematic structural diagram of an exemplary supporting device according to some embodiments of the present disclosure.

Reference numerals in the drawings include 101 first surface; 102 end surface; 103 third surface; 100 first support body; 110 first body; 111 first plate; 1111 first notch space; 112 second plate; 1121 second notch space; 113 first accommodation space; 114 first communication interface; 120 second body; 121 input assembly; 130 fixed enclosure; 131 first member; 132 second member; 133 third accommodation space; 160 first magnetic component; 200 second support body; 210 connector; 211 second accommodation space; 220 supporter; 300 display; 301 first side; 302 second side; 310 first peripheral side; 320 second peripheral side; 330 third peripheral side; 340 fourth peripheral side; 350 second magnetic component; 360 first structure; 370 second structure; 380 connecting member; 400 input device; and 500 supporting device.

DETAILED DESCRIPTION OF THE EMBODIMENTS

In order to make the objectives, technical solutions, and advantages of the present disclosure clearer, the present disclosure will be further described in detail below with reference to the accompanying drawings. Obviously, the described embodiments are only some of the embodiments of the present disclosure, not all of the embodiments. Based on the embodiments of the present disclosure, all other embodiments obtained by those of ordinary skill in the art without creative efforts shall fall within the scope of the present disclosure.

In the embodiments of the present disclosure, unless otherwise defined, the technical terms such as "connected" or "connection" are not limited to physical or mechanical connections, but may include electrical connections, whether external or internal between two elements, direct or indirect through an intermediary. These words used in the description of the embodiments of the present disclosure should have the usual meanings understood by those skilled in the art to which the embodiments of the present disclosure belong.

In the embodiments of the present disclosure, unless otherwise defined, the technical terms such as "first\second" and similar words used in the embodiments of the present disclosure do not indicate any order, quantity or importance, but are only used to distinguish similar components. It is understood that "first\second" may change a specific order or sequence where permitted. The "first\second" distinction may be interchanged under appropriate circumstances such that the embodiments of the present disclosure described herein may be practiced in sequences other than those illustrated or described herein.

The supporting device in the embodiment of the present disclosure will be described in detail below with reference to FIGS. 1-15.

The supporting device includes: a first support body 100 and a second support body 200. The first support body 100 includes: a first body 110 and a second body 120. The first body 110 is detachably connected to a display device 300, and includes a first accommodation space 113. The second body 120 is rotatably connected to the first body 110. The second body 120 is used to contact a bearing surface to maintain a spatial posture of the first body 110 or the display device 300 connected to the first body 110. The second support body 200 is detachably connected to the display device 300, and contacts the bearing surface to maintain the spatial posture of the display device 300. At least a part of the second support body 200 matches the first accommodation space 113, such that connecting the second support body 200 to the display device 300 does not affect the connection between the display device 300 and the first body 110. The supporting device is configured to support the display device 300 through at least one of the first support body 100 or the second support body 200. At the same time, connecting the second support body 200 to the display device 300 does not affect the connection between the display device 300 and the first body 110, thereby substantially improving adaptability of the supporting device.

Figure 16:
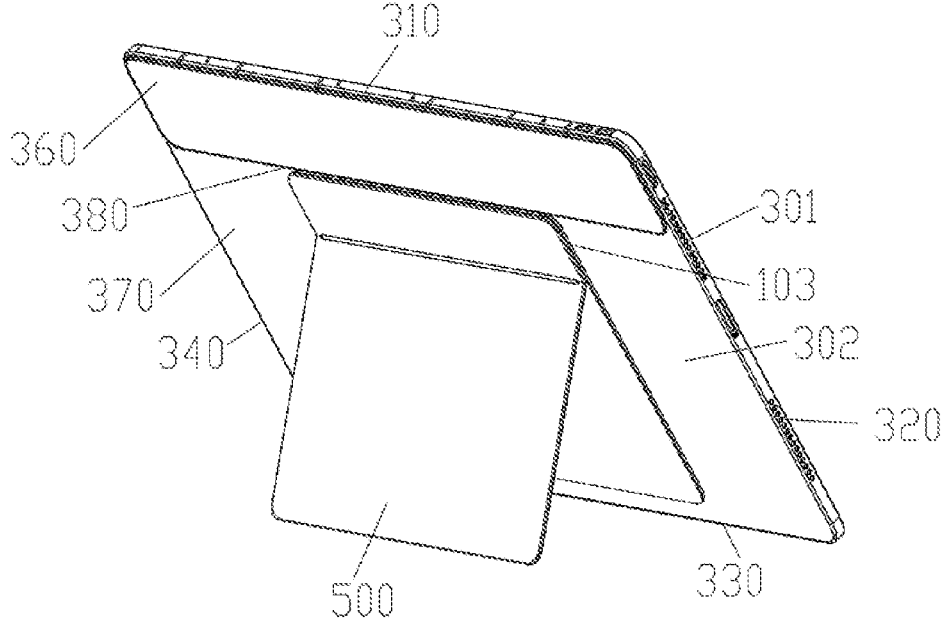
FIG. 16 is a schematic structural diagram of an exemplary electronic device according to some embodiments of the present disclosure.

In the embodiments of the present disclosure, the structure of the display is not limited. For example, the display may be a tablet computer or a mobile phone. In another example, the display may have a first side 301 and a second side 302 arranged opposite to each other. The first side 301 includes a display component, and the second side 302 includes at least a first structure 360 and a second structure 370. There is a height difference between a first height of the first structure 360 with respect to the first side 301 and a second height of the second structure 370 with respect to the first side 301. Shapes of the first structure 360 and the second structure 370 are not limited, as long as there is a height difference between the first structure 360 and the second structure 370 with respect to the first side 301. For example, as shown in FIG. 16, the first structure 360 may be in the shape of a flat plate, and the second structure 370 may be in the shape of a flat plate too. The first height may be greater than the second height, and the first structure 360 may be a protruding structure formed on the second side 302. Alternatively, the first height may also be smaller than the second height.

In some embodiments, when the first body 110 is detachably connected to the display device 300, at least a part of the second support body 200 may be located in the first accommodation space 113 and connected to the display device 300. At this time, the second support body 200 is in a stowed state. The second support body 200 is accommodated in the first accommodation space 113 such that the supporting device appears neat. The first accommodation space 113 is used to accommodate the second support body 200.

In some embodiments, the structure of the first body 110 is not limited. For example, the first body 110 may be a plate-shaped structure. In another example, as shown in FIG. 1, the first body 110 may be a rectangular parallelepiped structure.

The shape of the first accommodation space 113 is not limited. For example, as shown in FIG. 1, the first accommodation space 113 may be in the shape of a rectangular parallelepiped.

The first accommodation space 113 may be a through groove. In this case, the first accommodation space 113 connect between two back-to-back surfaces of the first body 110. For example, the first accommodation space 113 connects a first surface 101 of the first body 110 and a second surface of the first body 110. The second surface and the first surface 101 are arranged back-to-back. The first surface 101 is a surface on a side where the first body 110 and the display device 300 are connected, as shown in FIG. 1. Alternatively, the first accommodation space 113 may be a groove. In this case, only one opening is provided on a surface of the first body 110 is provided to connect to the first accommodation space 113.

In some embodiments, the structure of the second body 120 is not limited. For example, the second body 120 may be a plate-shaped structure. In another example, as shown in FIG. 1, the second body 120 may be a rectangular parallelepiped-shaped structure.

There is no limitation on how the second body 120 is rotatably connected to the first body 110. For example, the second body 120 and the first body 110 may be rotatably connected through a first rotating shaft assembly.

The second body 120 contacts the bearing surface to maintain the spatial posture of the first body 110 or the display device 300 connected to the first body 110. When the second body 120 is in contact with the bearing surface, there may be a gap between the first body 110 and the bearing surface. The bearing surface refers to a surface that supports the supporting device. For example, the bearing surface may be a desktop.

At least a part of the second support body 200 matches the first accommodation space 113, such that connecting the second support body 200 to the display device 300 does not affect the connection between the display device 300 and the first body 110. At least a part of the second support body 200 matching the first accommodation space 113 may refer to that a part of the second support body 200 can be accommodated in the first accommodation space 113, such that a part of the second support body 200 accommodated in the first accommodation space 113 connecting to the display device 300 does not affect the connection between the display device 300 and the first body 110. Alternatively, at least a part of the second support body 200 matching the first accommodation space 113 may also refer to that the entire second support body 200 can be accommodated in the first accommodation space 113, such that the second support body 200 entirely accommodated in the first accommodation space 113 connecting to the display device 300 does not affect the connection between the display device 300 and the first body 110.

For example, the first accommodation space 113 connects the first surface 101 of the first body 110 and the second surface of the first body 110. The second surface and the first surface 101 are arranged back-to-back. When at least a part of the second support body 200 is located in the first accommodation space 113 and is connected to the display device 300, a third surface 103 of the second support body 200 and the first surface 101 satisfy a coplanar condition. The first surface 101 is a surface on a side connecting the first body 110 and the display device 300, and the third surface 103 is a surface on a side connecting the second support body 200 and the display device 300, as shown in FIG. 1. As such, the display device 300 can be simultaneously in contact with the first surface 101 and the third surface 103 that satisfy the coplanar condition. The coplanar condition refers to being coplanar or substantially coplanar.

A fourth surface and the second surface of the second support body 200 may satisfy the coplanar condition. The fourth surface and the third surface 103 are arranged back-to-back, such that the second support body 200 is located in the first accommodation space 113 and maintains a same shape as the first body 110 to improve neatness of the supporting device. Alternatively, the fourth surface and the second surface of the second support body 200 may not satisfy the coplanarity condition.

In another example, the first accommodation space 113 includes a first opening located on the second surface of the second support body 200, and at least a part of the second support body 200 is located in the first accommodation space 113 and is connected to the display device 300. The second support body 200 is not in contact with the display device 300 in the first accommodation space 113. The second support body 200 may be connected to the display device 300 through a magnetic structure. A part of the first body 110 located between the second support body 200 and the display device 300 does not affect the connection between the second support body 200 and the display device 300.

The fourth surface of the second support body 200 and the second surface of the first body 110 may satisfy the coplanar condition. The fourth surface of the second support body 200 is a surface of at least a part of the second support body 200 located in the first accommodation space 113 that is exposed on the outside. As such, the second support body 200 is located in the first accommodation space 113 and maintains the same shape as the first body 110, thereby improving the neatness of the supporting device. Alternatively, the fourth surface of the second support body 200 and the second surface may not satisfy the coplanar condition.

In some other embodiments, when at least a part of the second support body 200 is located in the first accommodation space 113, the second support body 200 may be clamped in the first accommodation space 113, such that when the first body 110 is not connected to the display device 300, the second support body 200 can still be accommodated in the first accommodation space 113. The second support body 200 can be clamped in the first accommodation space 113 through a clamping structure.

In some embodiments, the first body 110 may include: a first plate 111 and a second plate 112. The first plate 111 is rotatably connected to the second body 120. The second plate 112 is rotatably connected to the first plate part 111. The second plate 112 is used to connect to the display device 300 for supporting the display device 300. The second plate 112 may rotate relative to the first plate 111 until the second plate 112 and the first plate 111 do not satisfy the coplanar condition. Through the first plate 111, the second body 120 maintains the spatial posture of the second plate 112 or the display device 300 connected to the second plate 112. Based on the rotation of the second plate part 112 relative to the first plate part 111 to the desired position where the second plate 11 and the first plate 111 do not satisfy the coplanar condition, more spatial postures of the supporting device may be available for supporting the display device 300.

Figure 4:
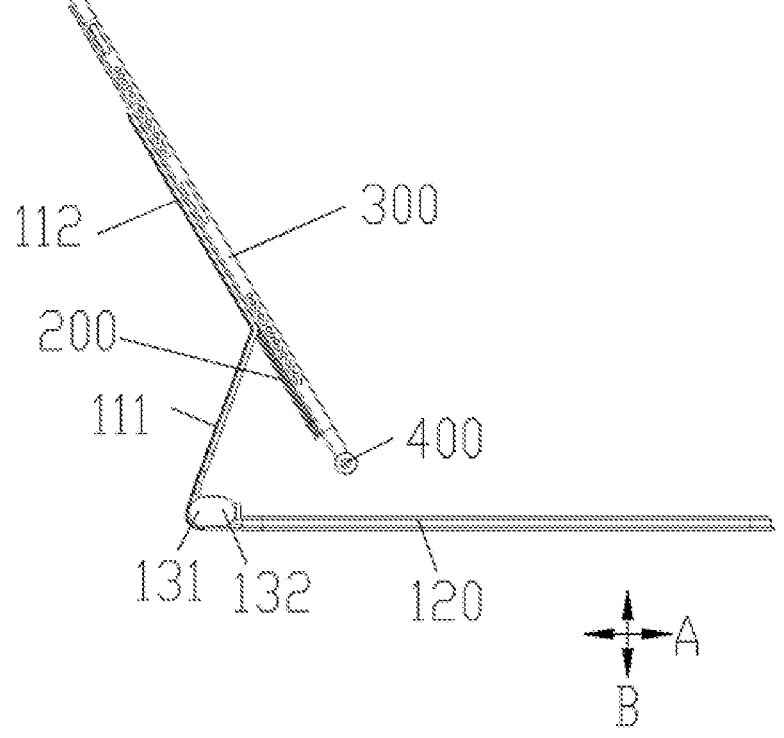
FIG. 4 is a schematic structural diagram of another exemplary supporting device according to some embodiments of the present disclosure.

In some embodiments, the first plate 111 is rotatably connected to the second body 120, and the second plate 112 is rotatably connected to the first plate 111. When the second plate 112 is connected to the display device 300 for supporting the display device 300, the supporting device can support the display device 300 at various display angles, as shown in FIG. 4.

In some embodiments, the shape of the first plate 111 is not limited. For example, the first plate 111 may be a rectangular parallelepiped structure.

The implementation of the rotatable connection between the first plate 111 and the second body 120 is not limited. For example, the first plate 111 and the second body 120 may be rotatably connected through a first rotating shaft assembly. In some embodiments, the shape of the second plate 112 is not limited. For example, the second plate 112 may be another rectangular parallelepiped structure.

The first accommodation space 113 may be provided on the first plate 111 or the second plate 112. Alternatively, the first accommodation space 113 may also be provided on both the first plate 111 and the second plate 112.

For example, the first plate 111 includes a first notch space 1111 at a side adjacent to the second plate 112, and the second plate 112 includes a second notch space 1121 at a side adjacent to the first plate 111. The first notch space 1111 and the second space 1121 are connected to form the first accommodation space 113.

The first notch space 1111 may be a through groove. In this case, the first notch space 1111 connects to two back-to-back surfaces of the first plate 111. Alternatively, the first notch space 1111 may be a groove. In this case, only one opening is provided at a surface of the first plate 111 to connect to the first notch space 1111.

The second notch space 1121 may be a through groove. In this case, the second notch space 1121 connects to the two back-to-back surfaces of the second plate 112. Alternatively, the second notch space 1121 may be a groove. In this case, only one opening is provided at a surface of the second plate 112 to connect to the second notch space 1121.

Figure 6:
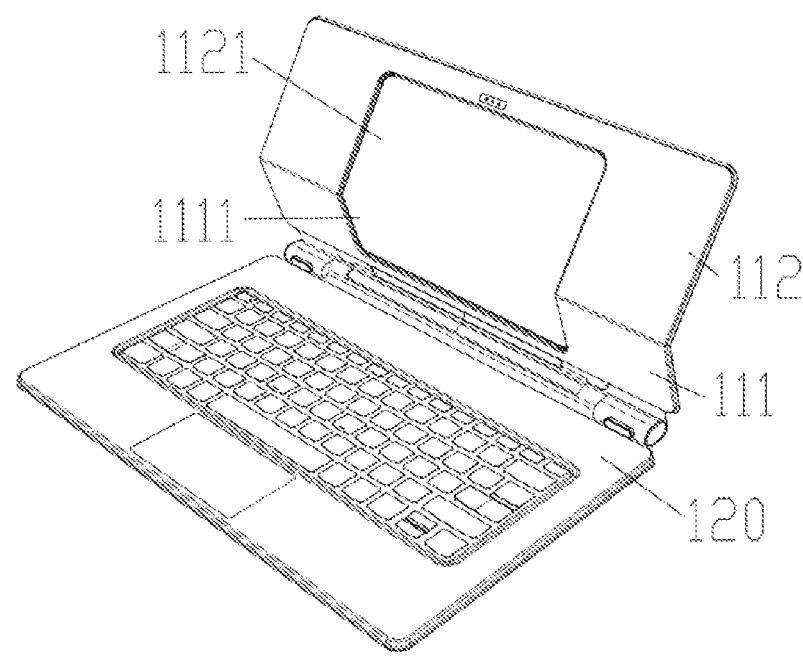
FIG. 6 is a schematic structural diagram of another exemplary supporting device according to some embodiments of the present disclosure.

The first notch space 1111 and the second notch space 1121 may both be through grooves, or both may be grooves. Alternatively, one of the first notch space 1111 and the second notch space 1121 may be a through groove and the other may be a groove. For example, as shown in FIG. 6, the first notch space 1111 and the second notch space 1121 may both be through grooves.

Figure 2:
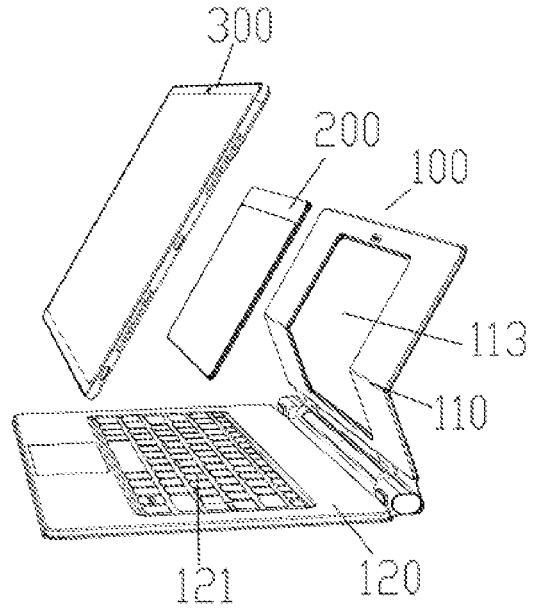
FIG. 2 is a schematic structural diagram of another exemplary supporting device according to some embodiments of the present disclosure.
Figure 3:
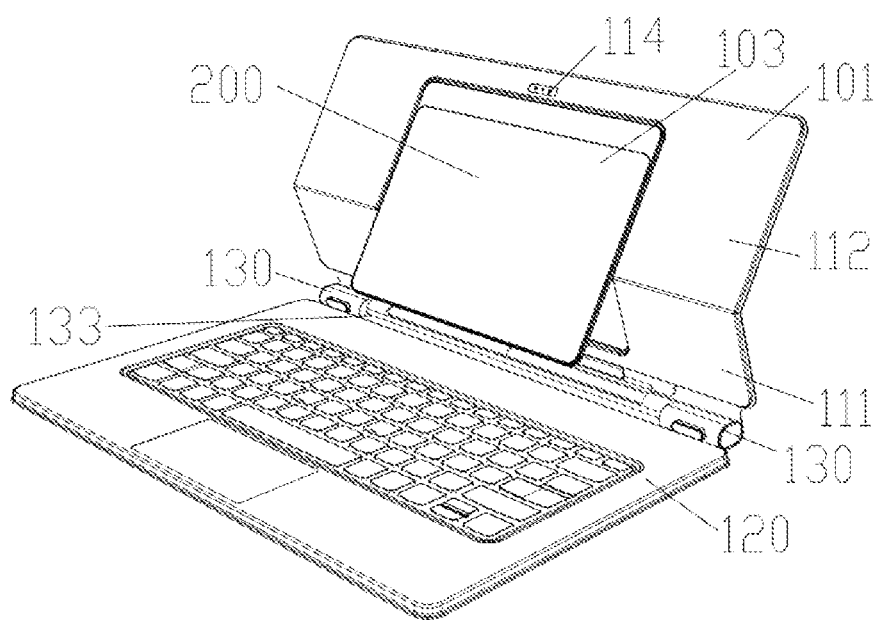
FIG. 3 is a schematic structural diagram of another exemplary supporting device according to some embodiments of the present disclosure.

When the second plate 112 rotates relative to the first plate 111 until the second plate 112 and the first plate do not satisfy the coplanar condition, the first notch space 1111 and the second notch space 1121 are not coplanar. When at least a part of the second support body 200 matches the second notch space 1121, connecting the second support body 200 to the display device 300 does not affect the connection between the display device 300 and the second plate 112, as shown in FIG. 2 and FIG. 3. The first surface 101 and the second surface described above are the surfaces of the second plate 112, and the description thereof will be omitted herein.

Figure 5:
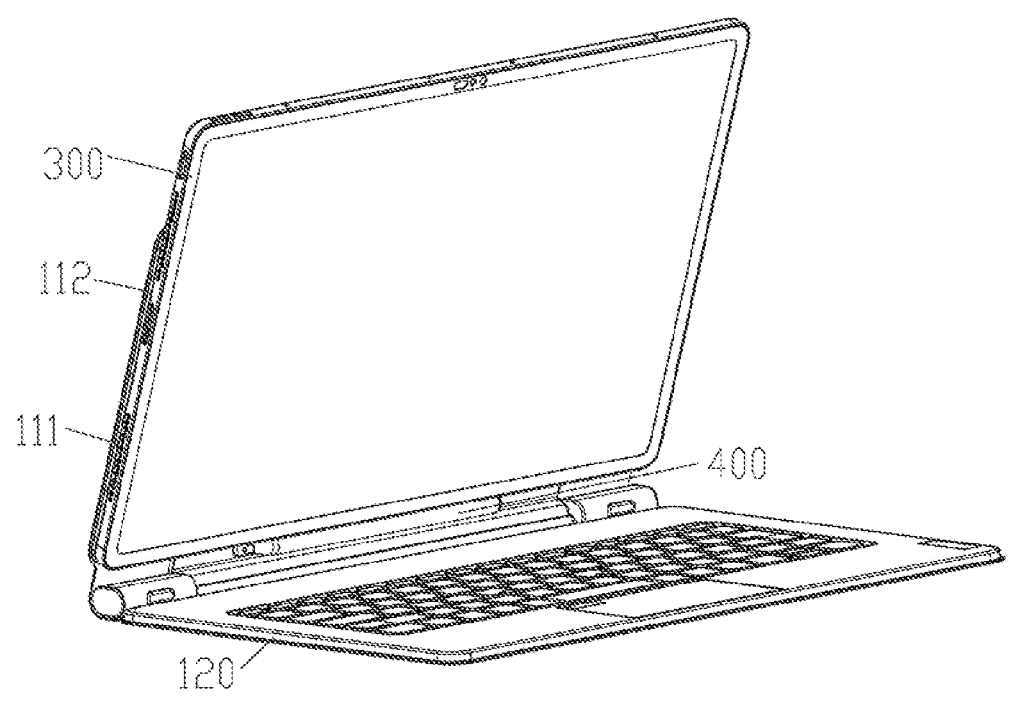
FIG. 5 is a schematic structural diagram of another exemplary supporting device according to some embodiments of the present disclosure.

In some embodiments, the second plate 112 rotates relative to the first plate 111 until both of them satisfy the coplanar condition. As shown in FIG. 5, the first plate 111 and the second plate 112 are coplanar, and the first plate 111 is connected to the display device 300. When both the first plate 111 and the second plate 112 are connected to the display device 300, the first plate 111 and the second plate 112 are combined into one plate. At this time, the first plate 111, the second plate 112, and the display device 300 may rotate together relative to the second body 120. Alternatively, the second plate 112 is rotated relative to the first plate 111 until both of them satisfy the coplanar condition, and the first plate 111 may not be connected to the display device 300.

In some other embodiments, the first body 110 may also be one single structure, as shown in FIG. 1.

In some embodiments, the second support body 200 may include: a connector 210 and a supporter 220. The connector 210 is used to detachably connect to the display device 300. The supporter 220 is rotatably connected to the connector 210, and includes at least two support modes. In a first support mode, the supporter 220 includes a first member 131 that is in contact with the bearing surface to maintain a first spatial posture of the display device 300. In a second support mode, the supporter 220 includes a second member 132 that is in contact with the bearing surface to maintain a second spatial posture of the display device 300. The first spatial posture and the second spatial posture satisfy a perpendicular condition. The supporting device can make the display device 300 in the first spatial posture and the second spatial posture by contacting the bearing surface through the second support body 200, thereby substantially improving the adaptability of the supporting device.

In some embodiments, the structure of the connector 210 is not limited. For example, the connector 210 may be a plate-shaped structure.

The implementation method of detachably connecting the connector 210 to the display device 300 is not limited. For example, the connector 210 and the display device 300 may be detachably connected through a magnetic structure or a clamp structure.

In some embodiments, the structure of the supporter 220 is not limited. For example, the supporter 220 may be another plate-shaped structure.

The implementation of rotatably connecting between the supporter 220 and the connector 210 is not limited. For example, the supporter 220 and the connector 210 may be rotatably connected through a third rotating shaft component. A position where the supporter 220 and the connector 210 are connected is not limited. For example, a peripheral side of the supporter 220 may be rotatably connected to a peripheral side of the connector 210.

Figure 7:
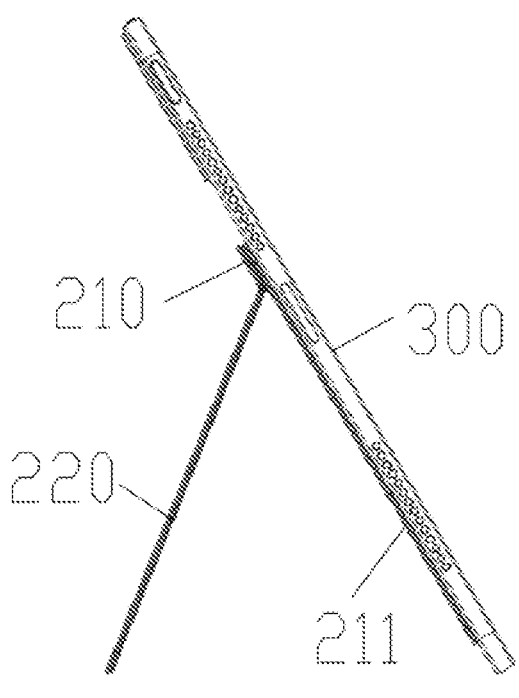
FIG. 7 is a schematic structural diagram of a second support member of an exemplary supporting device according to some embodiments of the present disclosure.
Figure 8:
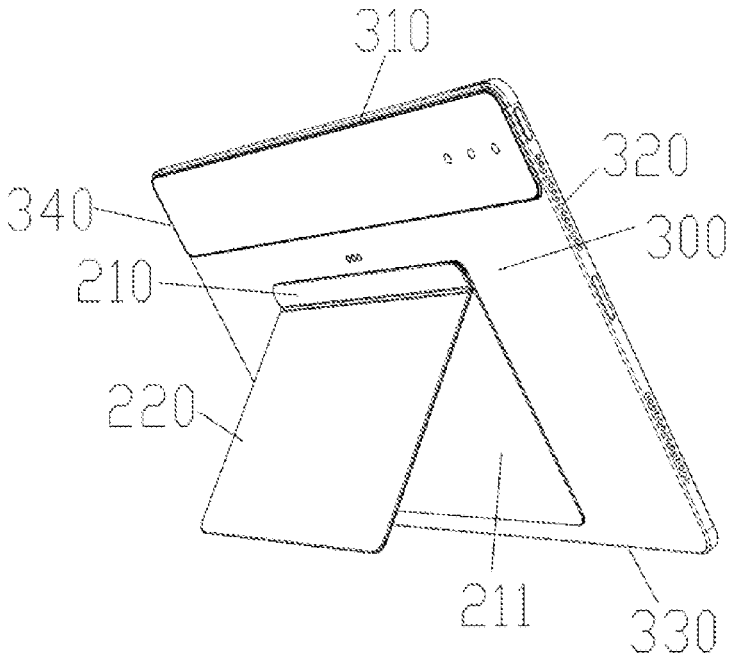
FIG. 8 is a schematic structural diagram of another second support member of an exemplary supporting device according to some embodiments of the present disclosure.
Figure 9:
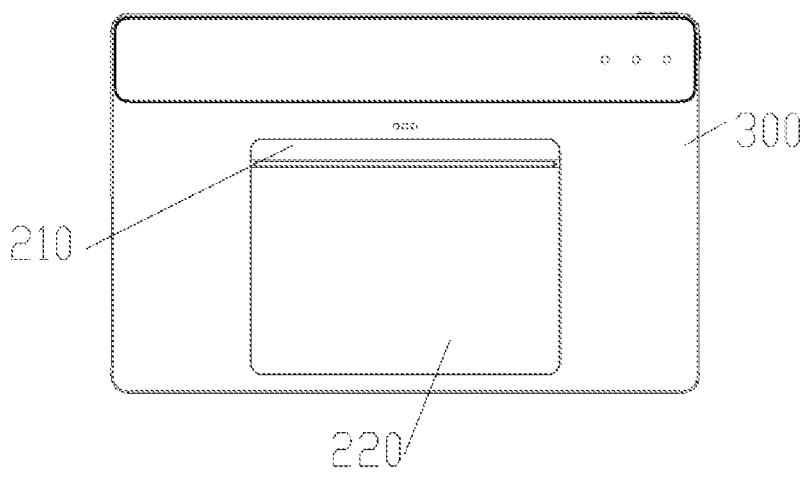
FIG. 9 is a schematic structural diagram of another second support member of an exemplary supporting device according to some embodiments of the present disclosure.

In another example, as shown in FIG. 7 and FIG. 8, the connector 210 includes a second accommodation space 211. The supporter 220 is connected to the connection part 210 in the second accommodation space 211. The supporter 220 rotates relative to the connector 210 until the supporter 220 and an outer surface of the connector 210 satisfy the coplanar condition in the second accommodation space 211. As shown in FIG. 9, the supporter 220 and the connector 210 are combined to approximately form one single plate. The supporter 220 and the connector 210 are in a closed state.

The shape of the second accommodation space 211 is not limited. For example, as shown in FIG. 8, the second accommodation space 211 may be in the shape of a rectangular parallelepiped.

The coplanar condition refers to being coplanar or being substantially coplanar.

In some embodiments, structures of the first member 131 of the supporter 220 and the second member 132 of the supporter 220 are not limited. For example, as shown in FIG. 8, the first member 131 of the supporter 220 may be a side part of the supporter 220, and the second member 132 of the supporter 220 may be a corner part of the supporter 220.

In some embodiments, the perpendicular condition refers to being perpendicular or be substantially perpendicular.

In some embodiments, the display device 300 is plate-shaped. The display device 300 includes a first peripheral side 310, a second peripheral side 320, a third peripheral side 330, and a fourth peripheral side 340 that are connected in sequence. Lengths of the first peripheral side 310 and the third peripheral side 330 satisfy a same condition. Lengths of the second peripheral side 320 and the fourth peripheral side 340 satisfy the same condition. Adjacent peripheral sides among the first peripheral side 310, the second peripheral side 320, the third peripheral side 330, and the fourth peripheral side 340 satisfy the perpendicular condition. At the first spatial posture, the first peripheral side 310, the third peripheral side 330, and the bearing surface satisfy a parallel condition. At the second spatial posture, the second peripheral side 320, the fourth peripheral side 340, and the bearing surface satisfy the parallel condition.

Figure 10:
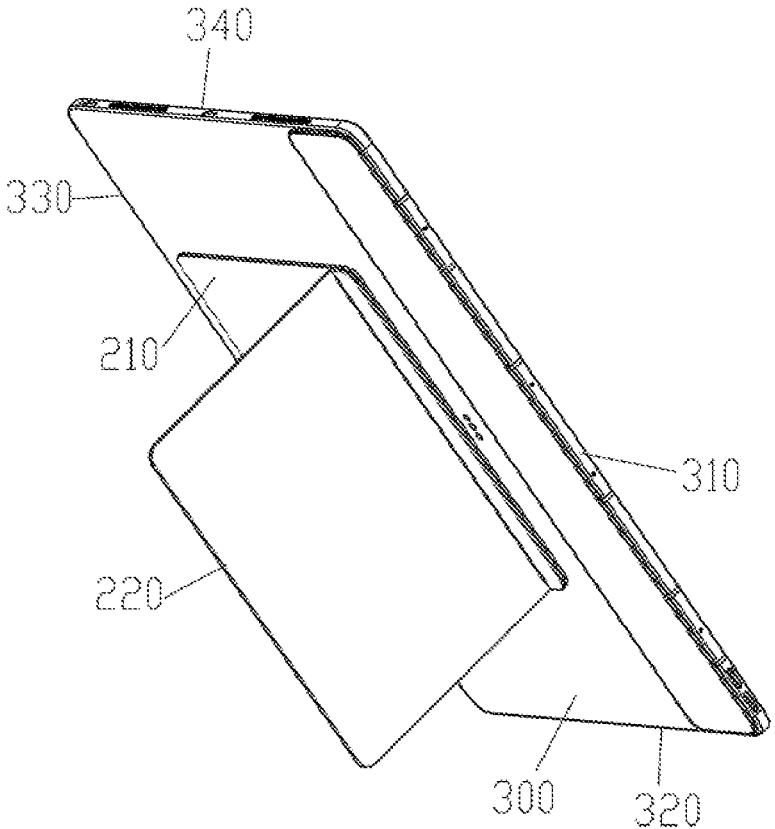
FIG. 10 is a schematic structural diagram of another second support member of an exemplary supporting device according to some embodiments of the present disclosure.

The same condition refers to being the same or being substantially the same. The parallel condition refers to being parallel or being substantially parallel. The length of the first peripheral side 310 may be greater than the length of the second peripheral side 320, as shown in FIG. 8 and FIG. 10. Alternatively, the length of the first peripheral side 310 may also be less than or equal to the length of the second peripheral side 320.

For example, the display device 300 is a rectangular parallelepiped structure. The first spatial posture may be a horizontal posture, as shown in FIG. 8. The second spatial posture may be a portrait posture, as shown in FIG. 10.

In some embodiments, at least a part of the second support body 200 matching the first accommodation space 113 may be the connector 210 matching with the first accommodation space 113, and at least a part of the connector 210 located in the first accommodation space 113 is detachably connected to the display device 300. The supporter 220 and the connector 210 may be in the closed state. At this state, the supporting device supports the display device 300 through the first support body 100. The second support body 200 is accommodated in the first accommodation space 113. The supporter 220 and the connector 210 being in the closed state facilitates accommodating the supporter 220 and the connector 210.

In some embodiments, the third surface 103 and the fourth surface refer to the third surface 103 and the fourth surface of the connector 210.

In some embodiments, the supporting device further includes: two fixed enclosures 130. The two fixed enclosures 130 are spaced apart and fixed to the second body 120. The two fixed enclosures 130 are located at a position where the second body 120 and the first body 110 are connected. A third accommodation space 133 is formed between the two fixed enclosures 130. The third accommodation space 133 is used to accommodate an input device 400, such that the supporting device can also accommodate the input device 400.

In some embodiments, the shape of the fixed enclosure 130 is not limited. For example, the fixed enclosure 130 may be in a shape of a rectangular parallelepiped. In another example, the fixed enclosure 130 may be spherically shaped.

In another example, the length of the fixed enclosure 130 in a first direction is greater than a length in a second direction. The first direction and a first rotation axis satisfy the perpendicular condition. The first rotation axis is an axis of rotation of the first body 110 relative to the second body 120. The second direction and the first direction satisfy the perpendicular condition. The second direction and the first rotation axis satisfy the perpendicular condition. The second direction and the bearing surface satisfy the perpendicular condition. In some embodiments, as shown in FIG. 4, the second direction B may be a height direction of the second body 120. When the second body 120 is a rectangular parallelepiped structure, the first direction A may be a width direction of the second body 120. The first rotation axis may be a length direction of the second body 120.

In some embodiments, the first body 110 and the second body 120 may be rotationally connected through the first rotating shaft assembly. At least a part of the first rotating shaft assembly is located in the fixed enclosure 130. At this state, the fixed enclosure 130 is used to form the third accommodation space 133 for accommodating at least a part of the first rotating shaft assembly.

For example, fixed enclosure 130 includes a first member 131 and a second member 132 that are adjacent to each other in the first direction. The first member 131 is used to accommodate the first rotating shaft assembly. The second member 132 is used to form the third accommodation space 133. At this state, the second member 132 forming the third accommodation space 133 is located closer to a free end of the second body 120, and the first member 131 accommodating the first rotating shaft assembly is located further away from the free end of the second body 120. The free end of the second body 120 refers to the opposite end of a connection end of the second body 120, and the connection end of the second body 120 refers to an end where the second body 120 is connected to the first body 110. In some embodiments, as shown in FIG. 4, a cross-section of the fixed enclosure 130 is oval-shaped.

The number of the first rotating shaft assemblies is not limited. For example, the supporting device may include two first rotating shaft assemblies. The first member 131 of one of the two fixed enclosures 130 accommodates one of the two first rotating shaft assemblies. The first member 131 of the other of the two fixed enclosures 130 accommodates the other of the two first rotating shaft assemblies. The second member 132 of one of the two fixed enclosures 130 and the second member 132 of the other of the two fixed enclosures 130 form the third accommodation space 133. The third accommodation space 133 may be a strip-shaped space formed along the direction of the first rotation axis. The strip-shaped space and the first rotation axis satisfy the parallel condition.

In some embodiments, a structure of the input device 400 is not limited. For example, the input device 400 may be an input pen, and the input pen is used to input information for the display device 300. The input device 400 may be detachably connected to a first peripheral side or a third peripheral side of a display device. The first peripheral side or the third peripheral side of the display device may be a peripheral side of the display device adjacent to the second body 120 when the display device 300 and the first body 110 are detachably connected to each other. At this time, the input device 400 located at the first peripheral side or the third peripheral side of the display device 300 may be accommodated in the third accommodation space 133. Alternatively, the input device 400 may also be directly accommodated in the third accommodation space 133.

In some embodiments, the first body 110 includes a first communication interface 114. The first communication interface 114 includes an end that is exposed on the first surface 101 of the first body 110, and is used for docking with a second communication interface of the display device 300. The second body 120 includes an input assembly 121. The input assembly 121 is electrically connected to the first communication interface 114. When the first body 110 is connected to the display device 300, the first communication interface 114 and the second communication interface are docked and electrically connected. The input assembly 121 may input information to the display device 300 through the first communication interface 114 and the second communication interface.

In some embodiments, the structure of the first communication interface 114 is not limited. For example, the first communication interface 114 may be a spring interface (i.e., pogo pin interface).

When the first body 110 includes the first plate 111 and the second plate 112, the first communication interface 114 may be provided on the second plate 112, as shown in FIG. 3.

In some embodiments, the structure of the input assembly 121 is not limited. For example, the input assembly 121 may be a physical keyboard or a touch input pad.

In some embodiments, the first body 110 may include a first connector. The first connector is disposed at the first surface 101 of the first body 110 to maintain a position relationship between the first body 110 and the display device 300. When the first body 110 is connected to the display device 300 through the first connector, the first communication interface 114 and the second communication interface are docked such that the first communication interface 114 and the second communication interface can be accurately docked through the first connector, misalignment between the first communication interface 114 and the second communication interface can be prevented. The misalignment may cause the first communication interface 114 and the second communication interface to be unable to be electrically connected.

The structure of the first connector is not limited. For example, the first connector may include at least two first magnetic components. The at least two first magnetic components are separately arranged on the first body 110. Each first magnetic component includes at least two first magnetic monomers. The at least two first magnetic monomers have opposite magnetism, such that when there is a positional deviation between the first communication interface 114 and the second communication interface, the first body 110 and the display device 300 are separated. When there is no positional deviation between the first communication interface 114 and the second communication interface, the first body 110 and the display device 300 are connected. The display may include at least two second magnetic components 350. Positions of the at least two second magnetic components 350 correspond to positions of the at least two first magnetic components. The at least two first magnetic components can be magnetically attracted to and connected to the at least two second magnetic components 350, respectively.

Figure 14:
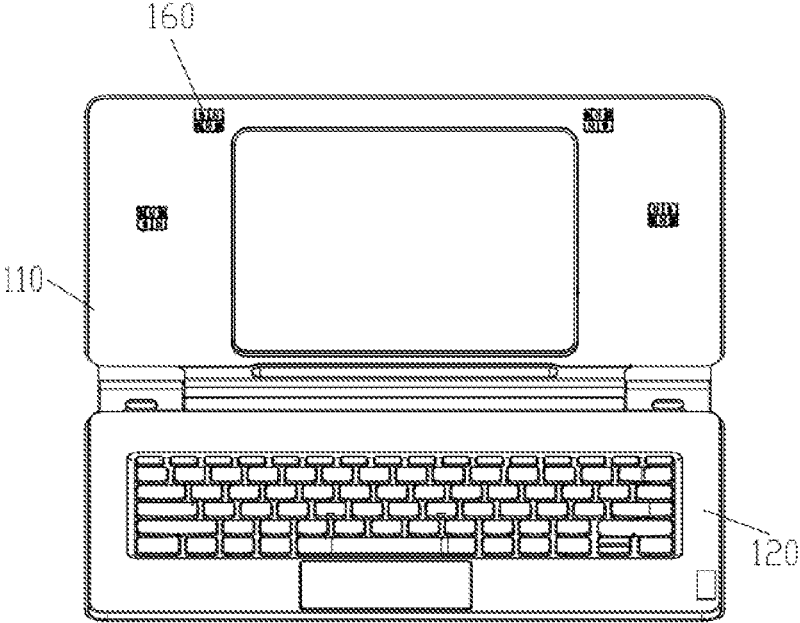
FIG. 14 is a schematic structural diagram of another exemplary supporting device according to some embodiments of the present disclosure.
Figure 15:
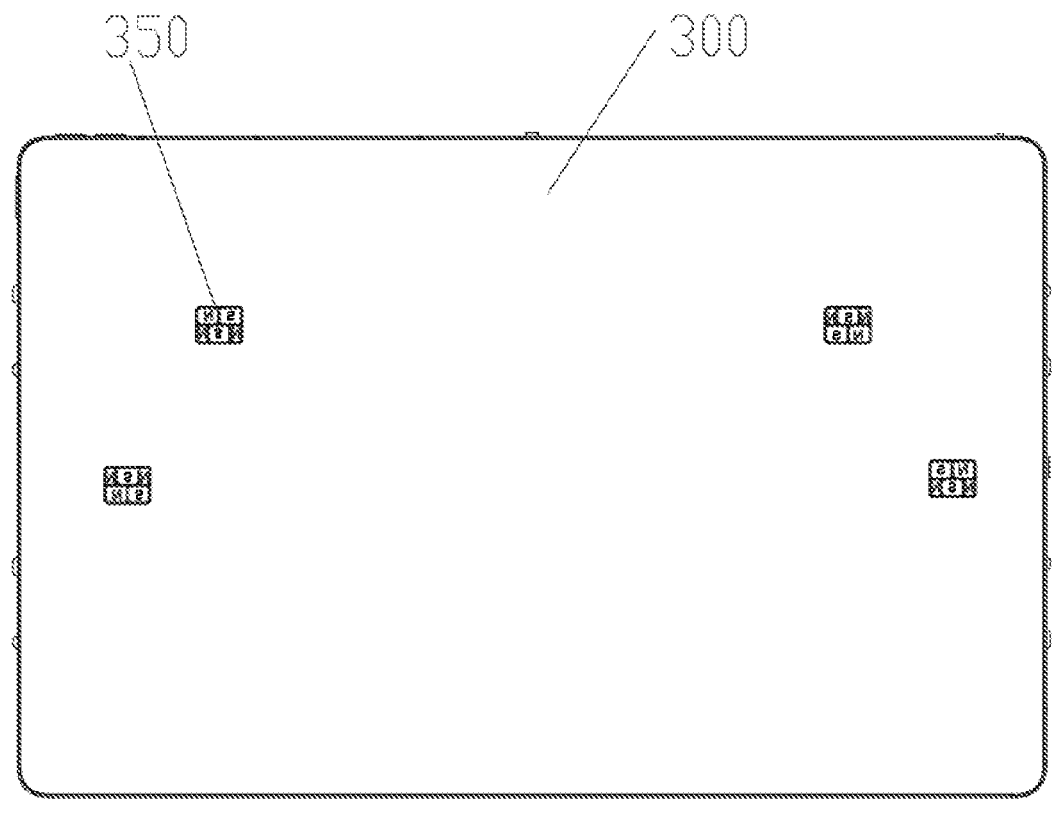
FIG. 15 is a schematic structural diagram of an exemplary display according to some embodiments of the present disclosure.

For example, as shown in FIG. 14 and FIG. 15, the first connector may include: four sets of first magnetic components 160 disposed at four corners of the first body 110. Each set of first magnetic components 160 includes five first magnetic monomers. The five first magnetic monomers include three positive monomers and two negative monomers. Each set of first magnetic components 160 is in the shape of a rectangular parallelepiped. The three positive monomers are located at three corners of the set of first magnetic components 160. One of the two negative monomers is located at the remaining corner of the set of first magnetic components 160, and the other of the two negative monomers is located in the middle of the set of first magnetic components 160. The five first magnetic monomers in each of the four sets of first magnetic components 160 are arranged differently, such that when there is a positional deviation between the first body 110 and the display device 300, the first body 110 and the display device 300 are separated. When there is no positional deviation between the first body 110 and the display device 300, the first body 110 and the display device 300 are connected. The display may include: four sets of second magnetic components 350. The positions of the four sets of second magnetic components 350 correspond to the positions of the four sets of first magnetic components 160, respectively. Each set of second magnetic components 350 includes five second magnetic monomers. Polarities of the five second magnetic monomers are opposite to polarities of the five first magnetic monomers at their corresponding positions.

When the first body 110 includes the first plate 111 and the second plate 112, the first communication interface 114 may be provided on the second plate 112, and the first connector may also be provided on the second plate 112.

Figure 11:
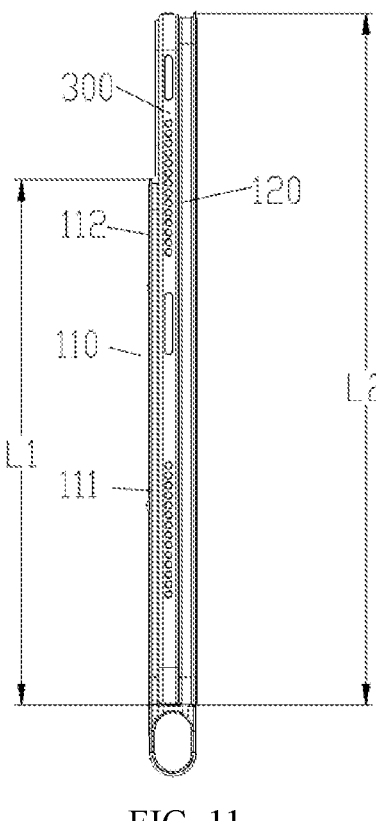
FIG. 11 is a schematic structural diagram of another exemplary supporting device according to some embodiments of the present disclosure.

In some embodiments, lengths of the second body 120 and the first body 110 in the direction of the first rotation axis are the same. A length between a connection end of the first body 110 and a free end of the first body 110 along the first body 110 is a first length L1. The length between the connection end of the second body 120 and the free end of the second body 120 along the second body 120 is a second length L2. The first length L1 is smaller than the second length L2, as shown in FIG. 11. As such, the second surface of the first body 110 and a surface of the first structure 360 on the second surface of the display device 300 satisfy the coplanar condition. The supporting device and the display device 300 form a neat structural appearance.

In some embodiments, the connection end of the first body 110 refers to an end where the first body 110 and the second body 120 are connected, and the free end of the first body 110 refers to the opposite end of the connection between the first body 110 and the first body 110.

When the first body 110 includes the first plate 111 and the second plate 112. The connection end of the first body 110 refers to the end where the first plate 111 and the second body 120 are connected. The free end of the first body 110 refers to the free end of the second plate 112. The first plate part 111 rotates relative to the second plate 112 around a second rotation axis. The second rotation axis and the first rotation axis satisfy the parallel condition. The first length is a sum of a distance between the connection end of the first plate 111 and the second rotation axis and a distance between the free end of the second plate 112 and the second rotation axis. Alternatively, when the second plate 112 rotates relative to the plate 111 to satisfy the coplanar condition, the first length L1 is the distance between the connection end of the first plate 111 and the free end of the second plate 112, as shown in FIG. 11.

When the first body 110 is a structural member, the first length is the distance between the connection end of the first body 110 and the free end of the first body 110.

In some embodiments, the connection end of the second body 120 refers to the end where the second body 120 is connected to the first body 110, and the free end of the second body 120 refers to the opposite end of the connection between the second body 120 and the first body 110. The second length is the distance between the connection end of the second body 120 and the free end of the second body 120.

In some embodiments, the free end of the first body 110 is in contact with the first structure 360 disposed at the second surface of the display device 300, such that the first body 110 supports the display device 300 through the free end of the first body 110.

Figure 12:
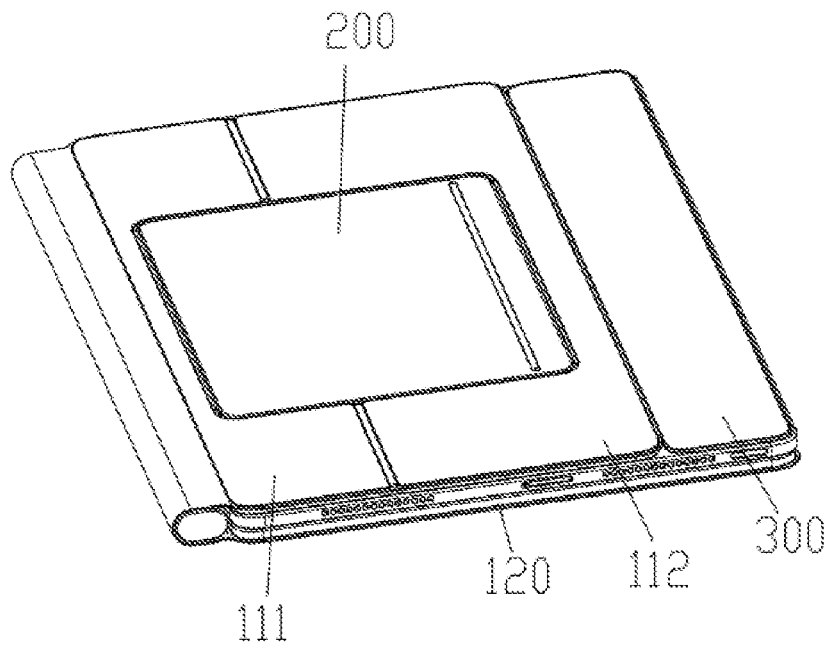
FIG. 12 is a schematic structural diagram of another exemplary supporting device according to some embodiments of the present disclosure.

In some embodiments, the first body 110 rotates relative to the second body 120 to the stowed state. In the stowed state, the first surface 101 faces toward the second body 120. A fourth accommodation space is formed between the first body 110 and the second body 120. The fourth accommodation space can accommodate the display device 300, as shown in FIG. 11 and FIG. 12.

In the stowed state, when the first body 110 includes the first plate 111 and the second plate 112, the first plate 111 and the second plate 112 satisfy the coplanar condition.

In the stowed state, when the second support body 200 includes the connector 210 and the supporter 220, the connector 210 and the supporter 220 are in the closed state.

The first body 110 is connected to the display device 300. When the first body 110 rotates relative to the second body 120, the first body 110 and the second body 120 may form a notebook posture, as shown in FIG. 5. At this time, when the first body 110 includes the first plate 111 and the second plate 112, the first plate 111 and the second plate 112 satisfy the coplanar condition.

Figure 13:
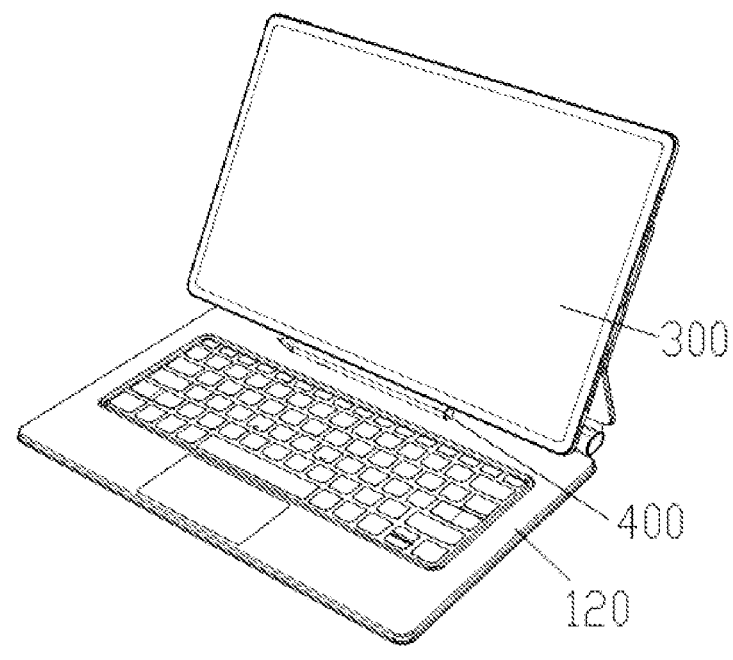
FIG. 13 is a schematic structural diagram of another exemplary supporting device according to some embodiments of the present disclosure.

The second plate 112 is connected to the display device 300. When the first plate 111 is separated from the display device 300, the second plate 112 rotates relative to the first plate 111, and the first plate 111 rotates relative to the second body 120. At this time, the second body 120 can support the display device 300 at various angles through the first plate 111 and the second plate 112, as shown in FIG. 13 and FIG. 4. At the same time, the second support body 200 can also support the display device 300 in a tablet posture, as shown in FIG. 7 and FIG. 10.

In some embodiments, the supporting device includes: a first support body 100 and a second support body 200. The first support body 100 includes: the first body 110 configured to detachably connect to the display device 300 and including the first accommodation space 113, and the second body 120 rotatably connected to the display device 300 and configured to contact with the bearing surface to maintain the spatial posture of the first body 110 or the display device 300 connected to the first body 110. The second support body 200 is configured to detachably connect to the display device 300, and is configured to contact the bearing surface to maintain the spatial posture of the display device 300. At least a part of the second support body 200 matches the first accommodation space 113, such that connecting the second support body 200 to the display device 300 does not affect the connection between the display device 300 and the first body 110. The supporting device may support the display device 300 through the first support body 100 and may support the display device 300 through the second support body 200. At the same time, connecting the second support body 200 to the display device 300 does not affect the connection between the display device 300 and the first body 110, thereby substantially improving the adaptability of the supporting device.

The present disclosure also provides an electronic device. The electronic device includes a display device 300 and a supporting device 500 disclosed in the embodiments of the present disclosure.

In some embodiments, the structure of the display device 300 is not limited. For example, the display device 300 may be a tablet computer.

In some embodiments, the display device 300 includes the first side 301 and the second side 302 arranged opposite to each other. The first side 301 includes a display component, and the second side 302 includes at least the first structure 360 and a second structure 370. There is a height difference between a first height of the first structure 360 above the first side 301 and a second height of the second structure 370 above the first side 301. The supporting device 500 is used to contact the second side 302 of the display device 300, and can at least maintain the spatial posture of the display device 300 by utilizing the connection portion 380 between the first structure 360 and the second structure 370. The connection portion 380 reflects the height difference, such that the supporting device 500 can at least maintain the spatial posture of the display device 300 by utilizing the connection portion 380 between the first structure 360 and the second structure 370, thereby substantially improving the adaptability of the electronic device.

Figure 17:
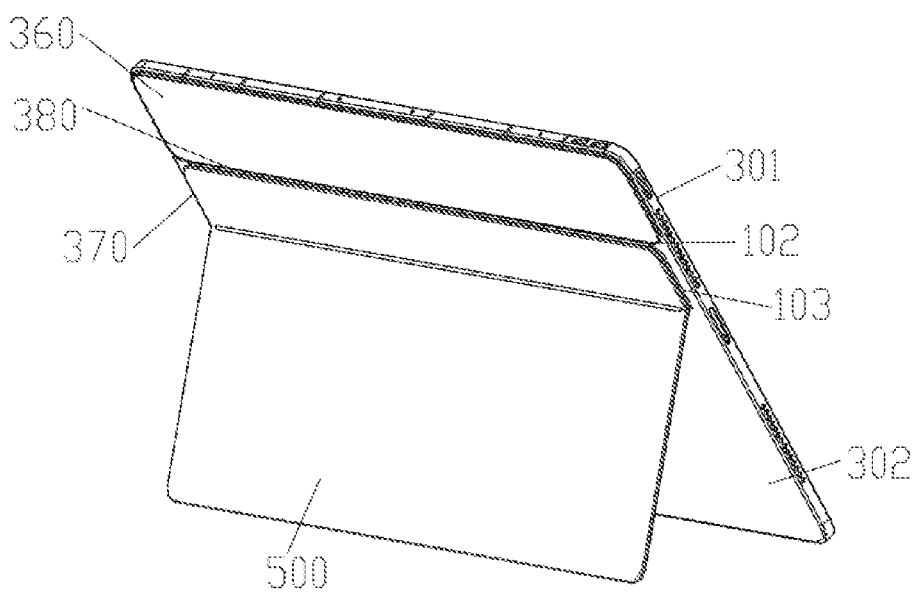
FIG. 17 is a schematic structural diagram of another exemplary electronic device according to some embodiments of the present disclosure.
Figure 18:
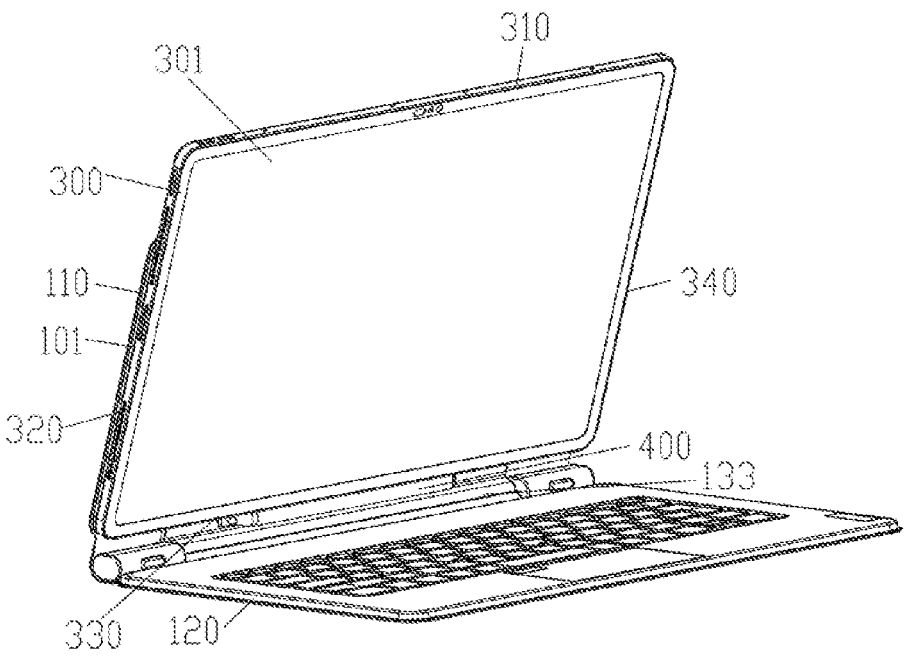
FIG. 18 is a schematic structural diagram of another exemplary electronic device according to some embodiments of the present disclosure.

In some embodiments, the connection portion 380 between the first structure 360 and the second structure 370 may be used to maintain the spatial posture of the display device 300 as the second support body, as shown in FIG. 16 and FIG. 17. Alternatively, the connection portion 380 between the first structure 360 and the second structure 370 can be used to maintain the spatial posture of the display device as the first support body, as shown in FIG. 18.

In some embodiments, the structure of the display device is not limited. For example, as shown in FIG. 16, the display device is plate-shaped and includes the first peripheral side, the second peripheral side, the third peripheral side, and the fourth peripheral side connected in sequence.

Shapes of the first structure 360 and the second structure 370 are not limited, as long as there is a height difference between the first structure 360 and the second structure 370 as compared to the first side 301. For example, as shown in FIG. 16, the first structure 360 may be flat plate-shaped, and the second structure 370 may also be flat plate-shaped.

The first height may be greater than the second height, and the first structure 360 may be a protruding structure formed at the second side 302. Alternatively, the first height may also be smaller than the second height.

The installation position of the first structure 360 is not limited. For example, the first structure 360 is located at an end of the display device 300. In another example, as shown in FIG. 16, the first structure 360 is located at the first peripheral side.

The size of the first structure 360 is not limited. For example, as shown in FIG. 16, the lengths of the first structure 360 and the display device 300 in a third direction satisfy the same condition to increase the length of the first structure 360 in the third direction. The same condition refers to being the same or being substantially the same. The third direction may be a direction formed between the first peripheral side and the third peripheral side are located, or may be the direction formed between the second peripheral side and the fourth peripheral side.

The connection portion 380 may be disposed along the third direction to increase a contact area between the supporting device 500 and the connection portion 380, thereby improving the support stability of the supporting device 500.

In some embodiments, a structure of the supporting device 500 is not limited, as long as the supporting device 500 is in contact with the second side 302 of the display device, and at least utilizes the connection portion 380 between the first structure 360 and the second structure 370 to maintain the spatial posture of the display device. For example, as shown in FIG. 16, when the supporting device 500 is the second support body, the third surface of the second support body is in contact with the second side 302, and an end surface 102 of the supporting device 500 is in contact with the connection portion 380 to maintain the spatial posture of the display device. At this time, the supporting device 500 supports the display device through the end surface 102, and the supporting device 500 maintains the positional relationship between the supporting device 500 and the display device through the contact between the third surface and the second side 302. The third surface 103 of the supporting device 500 and the end surface 102 of the supporting device 500 may be adjacent surfaces of the supporting device 500. In another example, as shown in FIG. 18, when the supporting device 500 is the first support body, the first surface 101 of the first body is in contact with the second side 302, and the end surface 102 of the first body is in contact with the connection portion 380 to maintain the desired spatial posture of the display device. At this time, the supporting device 500 supports the display device through the end surface 102, and the supporting device 500 maintains the positional relationship between the supporting device 500 and the display device through the contact between the first surface 101 and the second side 302. The first surface 101 of the supporting device 500 and the end surface 102 of the supporting device 500 may be adjacent surfaces of the supporting device 500.

The lengths of the end surface 102 of the supporting device 500 and the connection portion 380 in the third direction satisfy the same condition, as shown in FIG. 17, to increase the contact area between the supporting device 500 and the connection portion 380 and improve the support performance. Alternatively, the length of the end surface 102 of the supporting device 500 in the third direction may also be smaller than the length of the connection portion 380 in the third direction, as shown in FIG. 16.

In some embodiments, the end surface 102 of the supporting device 500 is in contact with the connection portion 380. The supporting device 500 includes the first connector. The first connector is provided at the first surface 101 or the third surface 103 of the supporting device 500 to detachably connect to the second side 302 of the display device to maintain the spatial posture of the display device. The supporting device 500 may jointly maintain the spatial posture of the display device through the first surface 101 or the third surface 103 and the end surface 102.

In some embodiments, a structure of the first connector is not limited. For example, the first connector may be a magnetic structure. In this case, the second side 302 of the display device may be an iron structure. Alternatively, the second side 302 of the display device may also be a magnetic surface.

In some embodiments, the first surface 101 or the third surface 103 of the supporting device 500 and the end surface 102 of the supporting device 500 may be adjacent surfaces of the supporting device 500. For example, the first surface 101 or the third surface 103 of the supporting device 500 and the end surface 102 of the supporting device 500 form a first angle. The value of the first angle is not limited. For example, the first angle may be 90°.

In some embodiments, the supporting device 500 may include: the first body 110 and the second body 120. The first surface 101 of the first body 110 is detachably connected to the second side 302, and the end surface 102 of the first body 110 is in contact with the connection portion 380. The second body 120 and the first body 110 are rotatably connected. The second body 120 is used to contact the bearing surface to maintain the spatial posture of the first body 110 or the display device connected to the first body 110, such that the display device form a notebook-like structure through the first body 110 and the second body 120.

Figure 20:
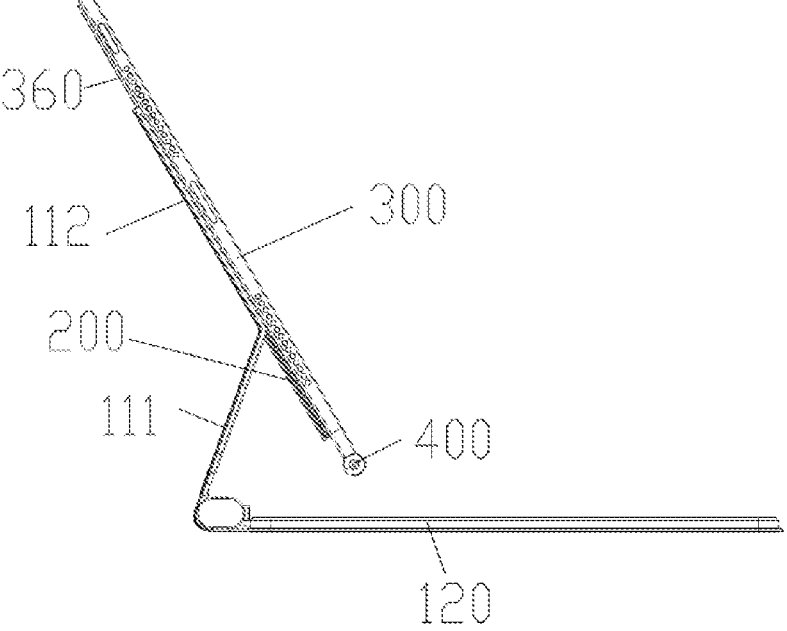
FIG. 20 is a schematic structural diagram of another exemplary electronic device according to some embodiments of the present disclosure.

As shown in FIG. 20, the first body 110 may include: the first plate and the second plate. The first plate is rotatably connected to the second body 120. The second plate is rotatably connected to the first plate. The first surface 101 of the second plate is detachably connected to the second side 302. The end surface 102 of the second plate may contact the connection portion 380. The second plate rotates relative to the first plate until the second plate and the first plate do not satisfy the coplanar condition. The second body 120 maintains the spatial posture of the second plate or the display device connected to the second plate through the first plate.

The thickness of the first body 110 is not limited. For example, the thickness of the first body 110 and the height difference satisfy the same condition, such that the first surface 101 and the second side 302 of the first body 110 are detachably connected. When the end surface 102 of the first body 110 is in contact with the connection portion 380, the second surface of the first body 110 and the first side 301 satisfy the coplanar condition, thereby making the electronic device neater. The coplanar condition refers to being coplanar or being substantially coplanar. The second surface of the first body 110 is arranged opposite to the first surface 101 of the first body 110.

In some embodiments, a length between the connection end of the first structure 360 and a first end of the first structure 360 is a third length. The connection end of the first structure 360 is an end connecting the first structure 360 and the second structure 370. The first end of the first structure 360 and the connection end of the first structure 360 are arranged opposite to each other.

Figure 19:
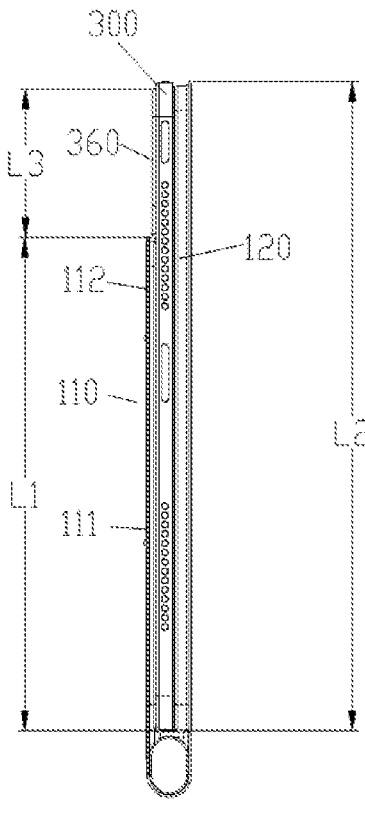
FIG. 19 is a schematic structural diagram of another exemplary electronic device according to some embodiments of the present disclosure.

The value of the third length is not limited. For example, as shown in FIG. 19, a difference between the second length and the first length, and the third length L3 satisfy the same condition, such that the length of the structure including the display device and the first body 110 is substantially the same as the length of the second body 120.

The first body 110 rotates relative to the second body 120 to the stowed state. In the stowed state, the first surface 101 of the first body 110 faces toward the second body 120. A fourth accommodation space is formed between the first body 110 and the second body 120. When the display device is located in the fourth accommodation space, the first structure 360 is in an exposed state. The first end of the first structure 360 and the free end of the second body 120 satisfy an alignment condition. The alignment condition refers to being aligned or being substantially aligned, as shown in FIG. 19. At this time, the first structure 360 is located at an end of the display device. The end of the display device and the free end of the second body 120 also satisfy the alignment condition.

The above description of the disclosed embodiments is provided to enable any person skilled in the art to make or use the present application. Various modifications to these embodiments will be readily apparent to those skilled in the art, and the general principles defined herein may be implemented in other embodiments without departing from the spirit or scope of the present disclosure. Therefore, the present disclosure will not be limited to the embodiments shown herein, but is to be accorded the broadest scope consistent with the principles and novel features disclosed herein.

What is claimed is:

1. A supporting device comprising:
   a first support body including:
      a first body configured to detachably connect to a display device and including a first accommodation space; and
      a second body rotatably connected to the first body and configured to be in contact with a bearing surface to maintain a spatial posture of the first body or the display device connected to the first body; and
   a second support body configured to rotatably connect to the display device and be in contact with the bearing surface to maintain a spatial posture of the display device, the second support body not being connected to the first body;
   wherein at least a part of the second support body matches the first accommodation space, such that connecting the second support body to the display device does not affect the connection between the display device and the first body, and when the display device is connected to the first body, at least a part of the second support body is located in the first accommodation space and remains connected to the display device.

2. The supporting device according to claim 1, wherein the first body includes:
   a first plate rotatably connected to the second body; and
   a second plate rotatably connect to the first plate and configured to connect to the display device to support the display device;
   wherein the second plate rotates relative to the first plate until the second plate and the first plate do not satisfy a coplanar condition, and the second body uses the first plate to maintain a spatial posture of the second plate or the display device connected to the second plate.

3. The supporting device according to claim 2, wherein:
   the first plate includes a first notch space at a side adjacent to the second plate, and the second plate includes a second notch space at a side adjacent to the first plate; and
   the first notch space and the second notch space together form the first accommodation space.

4. The supporting device according to claim 1, wherein the second support body includes:
   a connector configured to detachably connect to the display device; and
   a supporter rotatably connected to the connector and having at least two support modes;

wherein:

in a first support mode, the supporter includes a first member that is in contact with the bearing surface to maintain a first spatial posture of the display device; and in a second support mode, the supporter includes a second member that is in contact with the bearing surface to maintain a second spatial posture of the display device, and the first spatial posture and the second spatial posture satisfy a perpendicular condition.

5. The supporting device according to claim 1, wherein:

the first accommodation space connects a first surface of the first body and a second surface of the first body, the first surface and the second surface being arranged back-to-back; and in response to at least a part of the second support body being located in the first accommodation space and being connected to the display device, a third surface of the second support body and the first surface satisfy the coplanar condition, and a fourth surface of the second support body and the second surface satisfy the coplanar condition, wherein the first surface is a surface on a side of connecting the first body and the display device, the third surface is a surface on a side connecting the second support body and the display device, and the third surface and the fourth surface are arranged back-to-back.

6. The supporting device according to claim 1, further comprising:

two fixed enclosures that are separately fixed to the second body and located at a position where the first body and the second body are connected;

wherein a third accommodation space is formed between the two fixed enclosures and is configured to accommodate an input device.

7. The supporting device according to claim 6, wherein:

each of the two fixed enclosures has a length in a first direction and a length in a second direction, the length in the first direction being greater than the length in the second direction;

the first body and the second body are rotatably connected through a first rotating shaft assembly;

each fixed enclosure includes a first member and a second member that are adjacent to each other in the first direction;

the first member is configured to accommodate the first rotating shaft assembly, and the second member is configured to form the third accommodation space; and the first direction and a first rotation axis satisfy the perpendicular condition, and the first rotation axis is an axis where the first body rotates relative to the second body.

8. The supporting device according to claim 1, wherein:

the first body and the second body have a same length in a direction of the first rotation axis;

a length between a connection end of the first body and a free end of the first body along the first body is a first length, a length between a connection end of the second body and a free end of the second body along the second body is a second length, and the first length is smaller than the second length; and the first rotation axis is an axis of rotation of the first body relative to the second body, the connection end of the first body refers to an end where the first body connects to the second body, and the connection end of the second body refers to an end where the second body connects to the first body.

9. The supporting device according to claim 1, wherein:

the first body includes a first communication interface, and the first communication interface includes an end that is exposed on the first surface of the first body, and is configured for docking with a second communication interface of the display device;

the second body includes an input assembly, and the input assembly is electrically connected to the first communication interface;

the first body includes a first connector, the first connector is disposed at the first surface of the first body to maintain a position relationship between the first body and the display device; and in response to the first body being connected to the display device through the first connector, the first communication interface and the second communication interface are docked.

10. An electronic device comprising a supporting device, wherein the supporting device includes:

a first support body including:

a first body configured to detachably connect to a display device and including a first accommodation space; and a second body rotatably connected to the first body and configured to be in contact with a bearing surface to maintain a spatial posture of the first body or the display device connected to the first body; and a second support body configured to rotatably connect to the display device and be in contact with the bearing surface to maintain a spatial posture of the display device, the second support body not being connected to the first body;

wherein at least a part of the second support body matches the first accommodation space, such that connecting the second support body to the display device does not affect the connection between the display device and the first body, and when the display device is connected to the first body, at least a part of the second support body is located in the first accommodation space and remains connected to the display device.

11. The electronic device according to claim 10, wherein the first body includes:

a first plate rotatably connected to the second body; and a second plate rotatably connect to the first plate and configured to connect to the display device to support the display device;

wherein the second plate rotates relative to the first plate until the second plate and the first plate do not satisfy a coplanar condition, and the second body uses the first plate to maintain a spatial posture of the second plate or the display device connected to the second plate.

12. The electronic device according to claim 11, wherein:

the first plate includes a first notch space at a side adjacent to the second plate, and the second plate includes a second notch space at a side adjacent to the first plate; and the first notch space and the second notch space together form the first accommodation space.

13. The electronic device according to claim 10, wherein the second support body includes:

a connector configured to detachably connect to the display device; and a supporter rotatably connected to the connector and having at least two support modes;

wherein:

in a first support mode, the supporter includes a first member that is in contact with the bearing surface to maintain a first spatial posture of the display device; and in a second support mode, the supporter includes a second member that is in contact with the bearing surface to maintain a second spatial posture of the display device, and the first spatial posture and the second spatial posture satisfy a perpendicular condition.

14. The electronic device according to claim 10, wherein:

the first accommodation space connects a first surface of the first body and a second surface of the first body, the first surface and the second surface being arranged back-to-back; and in response to at least a part of the second support body being located in the first accommodation space and being connected to the display device, a third surface of the second support body and the first surface satisfy the coplanar condition, and a fourth surface of the second support body and the second surface satisfy the coplanar condition, wherein the first surface is a surface on a side of connecting the first body and the display device, the third surface is a surface on a side connecting the second support body and the display device, and the third surface and the fourth surface are arranged back-to-back.

15. The electronic device according to claim 10, wherein the supporting device further includes:

two fixed enclosures that are separately fixed to the second body and located at a position where the first body and the second body are connected;

wherein a third accommodation space is formed between the two fixed enclosures and is configured to accommodate an input device.

16. The electronic device according to claim 15, wherein:

each of the two fixed enclosures has a length in a first direction and a length in a second direction, the length in the first direction being greater than the length in the second direction;

the first body and the second body are rotatably connected through a first rotating shaft assembly;

each fixed enclosure includes a first member and a second member that are adjacent to each other in the first direction;

the first member is configured to accommodate the first rotating shaft assembly, and the second member is configured to form the third accommodation space; and the first direction and a first rotation axis satisfy the perpendicular condition, and the first rotation axis is an axis where the first body rotates relative to the second body.

17. The electronic device according to claim 10, wherein:

the first body and the second body have a same length in a direction of the first rotation axis;

a length between a connection end of the first body and a free end of the first body along the first body is a first length, a length between a connection end of the second body and a free end of the second body along the second body is a second length, and the first length is smaller than the second length; and the first rotation axis is an axis of rotation of the first body relative to the second body, the connection end of the first body refers to an end where the first body connects to the second body, and the connection end of the second body refers to an end where the second body connects to the first body.

18. The electronic device according to claim 10, wherein:

the first body includes a first communication interface, and the first communication interface includes an end that is exposed on the first surface of the first body, and is configured for docking with a second communication interface of the display device;

the second body includes an input assembly, and the input assembly is electrically connected to the first communication interface;

the first body includes a first connector, the first connector is disposed at the first surface of the first body to maintain a position relationship between the first body and the display device; and in response to the first body being connected to the display device through the first connector, the first communication interface and the second communication interface are docked.

19. A supporting device comprising:

a first support body including:

a first body configured to detachably connect to a display device and including a first accommodation space; and a second body rotatably connected to the first body and configured to be in contact with a bearing surface to maintain a spatial posture of the first body or the display device connected to the first body; and a second support body configured to rotatably connect to the display device and be in contact with the bearing surface to maintain a spatial posture of the display device, the second support body not being connected to the first body, wherein:

at least a part of the second support body matches the first accommodation space, such that connecting the second support body to the display device does not affect the connection between the display device and the first body;

the first body includes: a first plate rotatably connected to the second body; and a second plate rotatably connect to the first plate and configured to connect to the display device to support the display device;

the second plate rotates relative to the first plate until the second plate and the first plate do not satisfy a coplanar condition, and the second body uses the first plate to maintain a spatial posture of the second plate or the display device connected to the second plate;

the first plate includes a first notch space at a side adjacent to the second plate, and the second plate includes a second notch space at a side adjacent to the first plate;

the first notch space and the second notch space together form the first accommodation space; and the first notch space and the second notch space are not coplanar when the second plate and the first plate do not satisfy the coplanar condition.

*　*　*　*　*